No. 719,984. PATENTED FEB. 10, 1903.
F. M. ASHLEY.
ELECTRIC RAILWAY.
APPLICATION FILED FEB. 26, 1898.
NO MODEL.
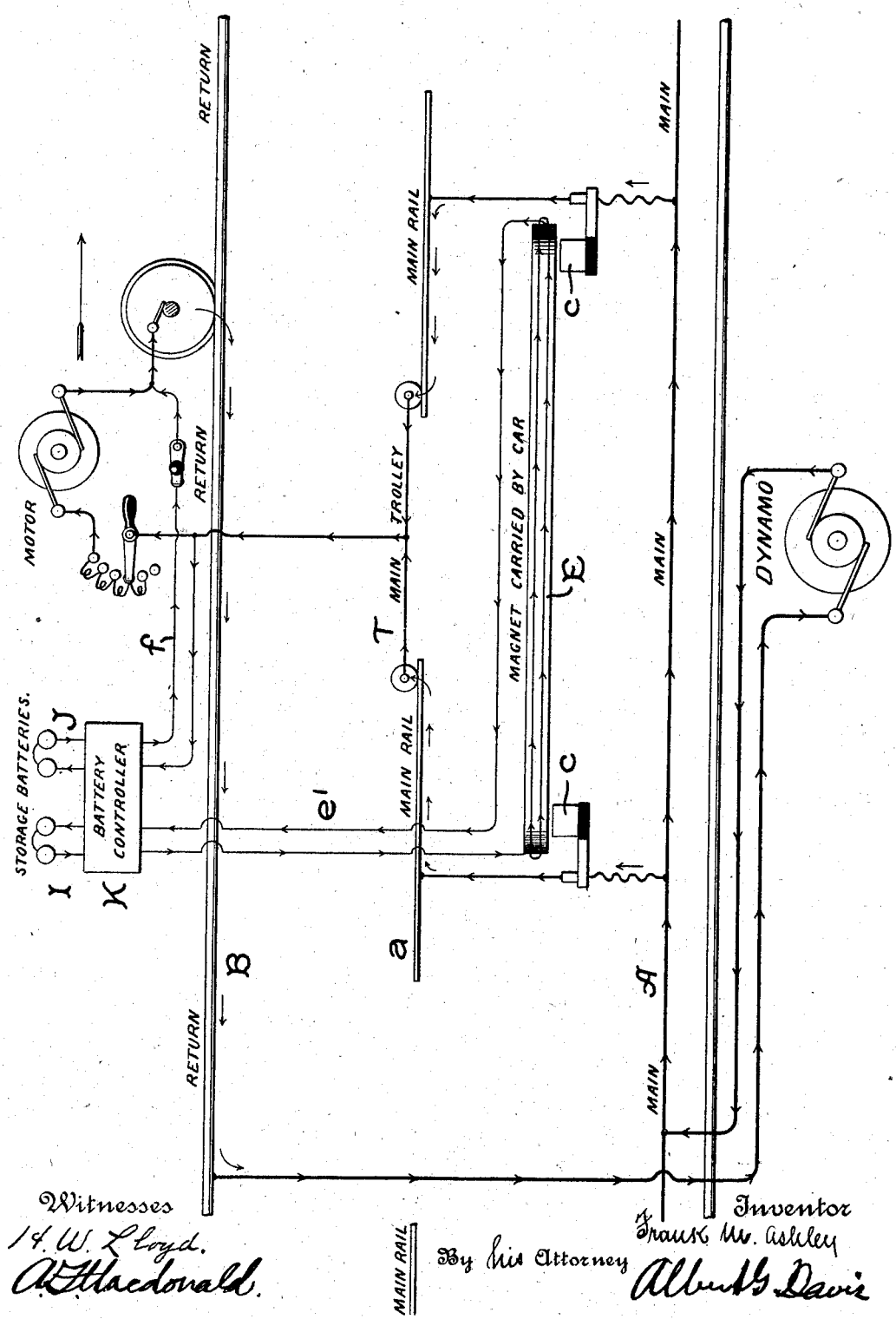
Witnesses
H. W. Lloyd.
A. F. Macdonald.
By his Attorney
Inventor
Frank M. Ashley
Albert G. Davis

UNITED STATES PATENT OFFICE.

FRANK M. ASHLEY, OF BROOKLYN, NEW YORK, ASSIGNOR TO GENERAL ELECTRIC COMPANY, A CORPORATION OF NEW YORK.

ELECTRIC RAILWAY.

SPECIFICATION forming part of Letters Patent No. 719,984, dated February 10, 1903.

Application filed February 26, 1898. Serial No. 671,793. (No model.)

*To all whom it may concern:*

Be it known that I, FRANK M. ASHLEY, a citizen of the United States, residing at Brooklyn, county of Kings, State of New York, have invented certain new and useful Improvements in Electric Railways, of which the following is a specification.

This invention relates to electric railways of that class in which a main insulated conductor is used in connection with sectional exposed trolley or working conductors and switching devices operated automatically for controlling the circuits between the main conductor and the sections of the trolley-conductor.

My invention consists in the combination of an electromagnet carried by a car of sufficient length to bridge two switching devices, said switching devices controlling the connections between the respective sections of the sectional conductor and the main conductor or feeder, and a separate source of current carried by a car adapted to energize the said magnet.

In the accompanying drawing I have shown a diagrammatic representation of a railway system utilizing a single sectional trolley-conductor and a storage battery on the car for energizing the electromagnet used to operate the switches for connecting the sections of trolley-conductors with the feeder.

Referring now to the figure, the main conductor or feeder is represented by A, the rail B serving as a return-conductor. A single line of sectional exposed trolley-conductors $a$ is provided. The respective sections of the sectional conductor $a$ are connected to the feeder A by branch circuits. Each of these branch circuits is supposed to pass through a suitable box located in the road-bed or any other suitable point, the said box containing a block of soft iron $c$, which carries the insulated contacts of an automatically-actuated switch which controls the said branch circuit. One of these contact-boxes is provided for each section of a trolley or sectional conductor, and they are placed along the roadway at equal distances apart.

The car carries a trolley T, which makes continuous contact with the sectional conductor $a$. It also carries an elongated electromagnet E, supported in any desired manner, but located in a position to run within attractive distance of the blocks $c$ of the road-bed, the blocks $c$ acting as armatures to said electromagnet. The polar face of this magnet should be long enough to cover two of the blocks $c$ and should be continuous in order that each block may be held under its influence during the entire time that the magnet is passing it. The actuating-coil of this magnet is energized from a source of electricity, such as the storage batteries I and J, entirely separate and distinct from the main circuit. In such a system as just described the magnet will always be energized whether the car is connected with the main supply-circuit or not. Two sets of batteries are shown, because it is desirable to use the current from one to energize the magnet over the circuit $e'$ while charging the other battery from the main source of current-supply over the circuit $f$. A battery-controller K of any suitable construction is used for transferring the two sets of batteries from the charging to the discharging circuit.

Having thus described my invention, I claim—

1. In an electric railway, the combination with a feeder, of a sectional service or working conductor, the sections of said conductor being normally disconnected from said feeder, switches for closing the connection between the respective sections of the working conductor and said feeder, magnet-armatures mechanically connected with said switches, an electromagnet carried by the car having a continuous polar face adapted to attract two successive armatures simultaneously, and two sets of batteries carried by the car adapted to be connected alternately to the actuating-coil of the electromagnet and the main source of current-supply, whereby said magnet can be energized when the working conductor is disconnected from the feeder.

2. In an electric railway, the combination with a feeder, of a sectional service or working conductor, the sections of said conductor being normally disconnected from said feeder, switches for closing the connection between the respective sections of the working conductor and said feeder, magnet-armatures operatively connected with said switches, an electromagnet and two batteries carried by the car, and a controller adapted to connect each of said batteries alternately to the said electromagnet whereby said magnet may be energized independently of the connection between the working conductor and the feeder.

In witness whereof I have hereunto set my hand this 13th day of November, 1897.

FRANK M. ASHLEY.

Witnesses:
WM. A. ROSENBAUM,
HARRY BAILEY.